July 19, 1932.   J. A. STREUN   1,868,030
FEEDER FOR HULLY COTTON
Filed Aug. 22, 1929
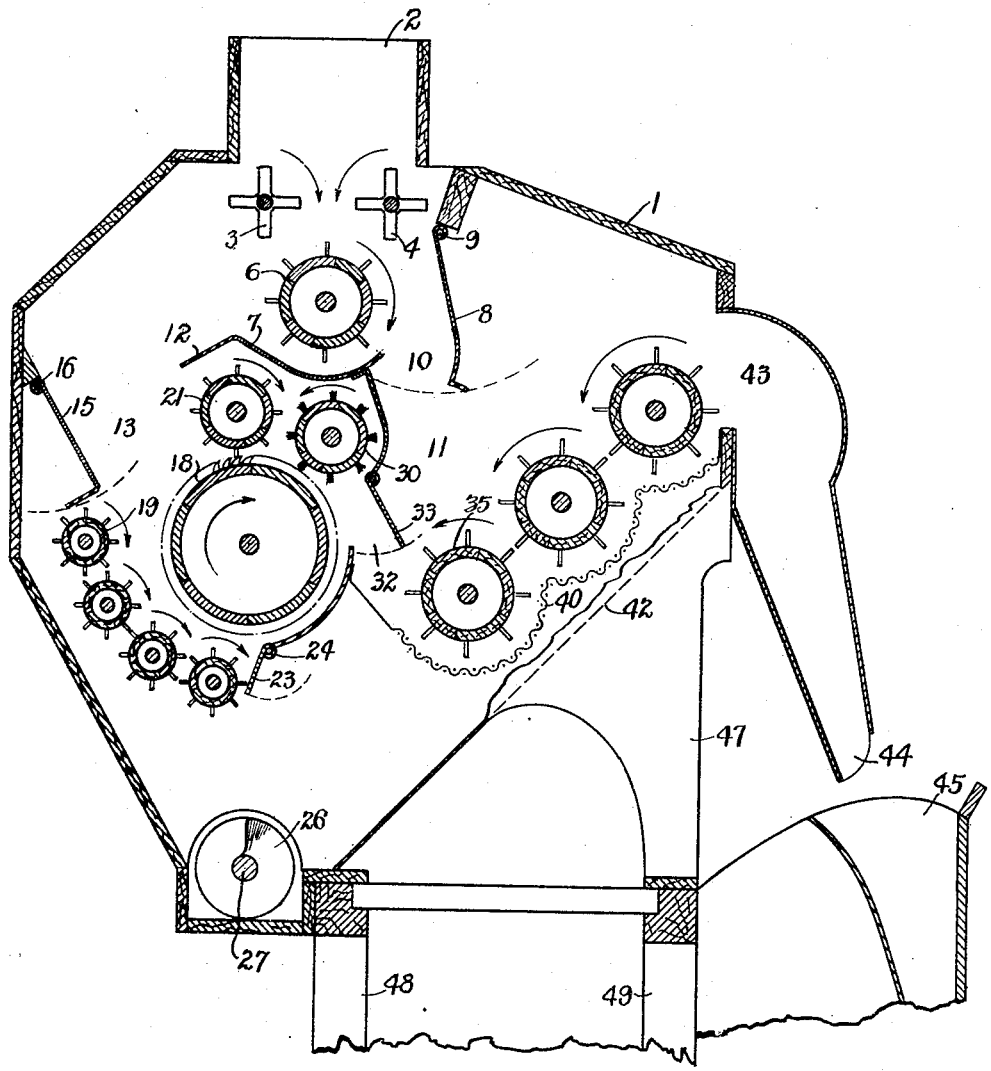
INVENTOR.
JOHN A. STREUN.
BY Jesse R. Stone
ATTORNEY.

Patented July 19, 1932

1,868,030

UNITED STATES PATENT OFFICE

JOHN ARNOLD STREUN, OF SHERMAN, TEXAS, ASSIGNOR TO HARDWICKE ETTER COMPANY, OF SHERMAN, TEXAS

FEEDER FOR HULLY COTTON

Application filed August 22, 1929. Serial No. 387,582.

The present invention relates particularly to an improved apparatus for treating the cotton by different processes before it is ginned in order to remove the burs and trash or to pass the cotton directly to the cleaner.

In cotton cleaners which have been devised heretofore it has been usual to pass the cotton directly into the cleaner and attempt to remove the heavier of the hulls and the trash during the cleaning operation. It has been found, however, that this is not entirely satisfactory and it is with the idea in mind of removing the heavier burs and trash and breaking up the unopened bolls that I have devised the present apparatus.

It is one of the objects of the invention to provide a feeder and cleaner wherein the operator may selectively pass the cotton to a series of knocker rolls or directly to the cleaner rolls.

It is the primary object of the invention to provide a machine that will serve as a regular cotton gin feeder but which will provide two methods of treatment for the cotton and has a hulling chamber and a cleaning chamber so that the operator may divert the stream of cotton from one chamber to the other depending upon the amount of hulling or cleaning that the cotton requires.

Another object of the invention is to provide a by-pass around the knocker rolls to the cleaner.

Another object of the invention is to arrange an adjustable passage for the burs and trash in order that this material may be subjected to additional agitation and come in contact with the saw roll.

Another object of the invention is to arrange an adjustable bevel to direct the hully cotton at various angles with respect to the saw and knocker rollers.

A still further object of the invention is to provide an adjustable passage from the saw roll to the cleaner roll.

A still further object of the invention is to arrange an entire apparatus so that by adjustment of the various parts the feeder may be arranged to accommodate practically any type of cotton which may be encountered and successfully clean the cotton ready for the gin.

The invention will be more readily understood when the following description is considered in connection with the accompanying drawing wherein a side elevation showing certain parts of the end of the feeder housing broken away to disclose the construction and arrangement of the various novel features of the invention.

The present invention is embodied in an apparatus which is shown as being contained within the housing 1. This housing may take any desired form but is preferably provided with an opening or inlet chute 2 at the top and it is through this chute that the cotton is fed to the huller and cleaner. It is the usual practice to run the cotton through a cleaning or a hulling machine before it is passed to the feeder which carries it into the gin. In this manner the burs and trash of a heavy nature are extracted from the cotton and a majority of the dirt is also removed so that when the cotton reaches the gin it is in proper condition for treatment.

A pair of fluted rollers 3 and 4 receive the cotton as it passes into the chute 2. These rollers 3 and 4 revolve in opposite directions and tend to move the cotton into a central position with respect to the chute. Directly below the rollers 3 and 4 is shown a spiked drum 6 which revolves in a clockwise direction and is spaced from the partition 7. The cotton passing through the rollers 3 and 4 comes in contact with the spiked drum 6 and is carried to the right as illustrated by the arrow in the drawing. Directly to the right of the drum 6 the partition 7 is provided with a door or baffle 8. This door is hinged at 9 to the housing 1 and is arranged to swing as indicated by the dotted line. The operation of this door may be accomplished by means of any type of suitable lever which may be mounted upon the pivot shaft at 9 and may be external of the housing 1 so that it will be readily accessible to the operator. This door 8 comprises the first and primary selection which may be exercised by the operator. If the cotton is comparatively clean and free from trash the operator may raise the door to the position shown in the figure and the spiked drum will serve to pass the cotton directly through the opening 10 so that it may fall into the cleaning rollers in the cleaning chamber 11 which will be later described. However, if the cotton contains burs and trash of a heavy nature and requires additional agitating and knocking the door 8 is moved to the closed position and the cotton instead of passing through the opening 10 is carried around the partition 7 by means of the spiked drum 6 and is thrown from the apron 12 into the hulling chamber indicated generally at 13.

The hulling chamber is within the housing 1 and is provided with a baffle 15 pivoted at 16 and operable with a suitable lever similar to the operation of the door 8 which was previously described. This baffle 15 is capable of movement as indicated by the dotted line. Thus when the hully cotton is passed from the apron 12 it will be received upon the baffle 15 and, depending on the condition of the cotton, it may be deflected directly against the saw roll 18 or upon the knocker rolls 19. The direction of rotation of each of the rollers is indicated by an arrow. As the cotton passes from the baffle or deflector 15 it is drawn upwardly by coming in contact with the saw teeth upon the saw roll 18 until it is engaged by the stripper roll 21. This stripper roll is provided with suitable spikes spaced appropriately so that any hulls or trash will be stripped from the cotton which is clinging to the saw teeth. When the hulls and trash are thrown out by the stripper roll they will fall free of the saw teeth and come in contact with the first of the spiked or knocker roll 19. I have shown in this particular illustration four of these knocker rolls 19 and it should be noted that they are located upon an arc with respect to the face of the saw roll 18. In this manner, as the hulls strike the first roll 19 they are at a greater distance from the saw roll than after they have come in contact with the last knocker roll near the bottom of the saw roll. In this manner the hulls and trash are gradually broken up by being passed into a gradually narrowing passage between the successive knocker rolls and the saw roll so that the larger bolls and pieces of trash will be caught by the saw roll and agitated until they are broken up and will then be permitted to pass downwardly and in contact with the lower knocker rolls.

It is to be understood that if the cotton is partly hully and contains heavy trash that the baffle 15 will be dropped down against the side of the housing 1 so that the cotton from the apron 12 will pass directly to the first knocker roll and be agitated to break up the trash and burs before it engages the saw roll. However, this adjustment may be varied at the will of the operator in order to obtain the most efficient results.

Adjacent the last of the knocker rollers is shown a valve or adjustable baffle 23 which is pivoted at 24 and may be placed in any desired position as indicated by the dotted line. This last or stop baffle is provided so that if there are any unopened bolls in the cotton being treated this baffle may be moved to the position indicated in the drawing and the bolls will be treated between this baffle and the last knocker roll 19 where they will be agitated and drawn into contact with the saw roll 18 until they are broken open. This baffle also constitutes a determining factor as to the size of the trash which may be passed from the last of the knocker rolls. Where the bolls are well opened and easily cleaned, the baffle 23 may be adjusted away from the lower knocker roll and allow the hulls to drop out at once and thus vary the degree of treatment by the saw roll.

When the trash passes from the last knocker roll and beyond the baffle 23 it will fall into a pit on the bottom of the housing where it will be engaged by the conveyor 26 which is rotatable upon the shaft 27 so that it will be carried from the cleaning machine.

The cotton which is picked up by the saw roll 18 will be removed from the teeth thereof by means of the brush roll 30 which revolves at a greater rate of speed than the saw roll and tends to brush the cotton lint forwardly from the teeth of the saw roll. The cotton thus brushed from the saw roll will pass through the opening 32 which is controlled by the adjustable valve 33. It seems apparent that by adjustment of this valve the amount of cotton permitted to pass from the saw roll 18 may be controlled and if it appears that the cotton coming from the saw roll has not been treated sufficiently the size of the opening 32 may be varied and the cotton compelled to continue its rotation about a saw roll and come again in contact with the knocker rolls 19.

The construction of the cleaner chamber 11 will now be described. As is evident from the foregoing description the cotton may be passed into the cleaner chamber either through the passage 10 directly from the feeder roll or it may enter through the passage 32 after having been subjected to the hulling operation. In either event the cotton will come in contact with the lower-most cleaner roll indicated at 35. This roll tends to draw the cotton inwardly and pass it into contact with the perforated lining 40. This lining is preferably of wire mesh or perforated metal and is shown as fluted in order to agitate the cotton as it passes thereover. Any small particles of dirt and trash which still remain in the cotton are permitted to pass through this perforated lining and fall upon the side 42 of the bin or housing. This dirt will pass downwardly by gravity and be carried away by the conveyor 26 along with the trash from the huller chamber.

The baffle 33 serves the additional purpose of guiding the cotton from the passage 10 upon the first cleaner roll. If it is desired that considerable cleaning be accomplished the baffle 33 may be raised upwardly so that the cotton will strike the first cleaner roll 35 approximately on the top. The second and third cleaner rolls serve to raise the cotton in its passage along the liner 40 and finally deposit it into the discharge 43. This discharge passage is in the nature of a chute 44 which leads to any suitable storage or to the ginning breast 45 where it will be fed directly into the gin.

The housing 1 is shown as mounted upon suitable supporting structures shown at 47, 48 and 49. It is believed that the foregoing description will enable those skilled in the art to understand the novel features without a detailed description of the steps of the operation. It is to be understood that various alterations and modifications may be made without departing from the spirit of the invention.

Having described my invention what I desire to secure by Letters Patent is:

1. In a cotton huller and cleaner, means to selectively direct the cotton to a cleaner chamber or a huller chamber, and means to control the degree of treatment in said hulling chamber including adjustable baffles at the entrance and exit of said huller chamber.

2. In a cotton huller and cleaner, means to selectively direct the cotton to a cleaner chamber or a huller chamber, and means to control the degree of treatment in said hulling chamber including an adjustable baffle spaced above the knocker rollers and arranged to direct the cotton onto or away from certain of said rollers.

3. In a cotton huller and cleaner, means to selectively direct the cotton to a cleaner chamber or a huller chamber, and means to control the degree of treatment in said hulling chamber, said means including a plurality of knocker rollers, a saw roll, and a stop baffle, said knocker rollers being arranged at different distances from said saw roll.

4. In a cotton huller and cleaner, means to selectively direct the cotton to a cleaner chamber or a huller chamber, and means to control the degree of treatment in said hulling chamber, said means including a plurality of knocker rollers, a saw roll, and a stop baffle, said knocker rollers being spaced so that each roller brings the cotton into more intimate contact with said saw roll.

5. A cotton huller and cleaner including a saw roll, a plurality of knocker rolls arranged to pass the cotton into contact with said saw roll, each succeeding knocker roll being spaced a less distance from the face of said saw roll, whereby the cotton is gradually brought into closer contact with said saw roll.

6. A cotton huller and cleaner including a saw roll, a plurality of knocker rolls, and means adjacent one of said knocker rolls to control the passage of refuse from said rolls, and additional adjustable means to direct the passage of cotton to said knocker rolls.

7. In a cotton cleaner a feeder roll, a cleaner chamber, a plurality of cleaner rolls therein, an adjustable passage to said chamber, and an adjustable valve below said passage acting as a deflector within said chamber to direct the cotton relative to said rolls and vary the degree of cleaning.

8. In a cotton cleaner a feeder roll, a cleaner chamber, a plurality of cleaner rolls therein, an adjustable passage to said chamber and an adjustable valve within said chamber to alter the degree of cleaning by deflecting the cotton with respect to said cleaner rolls.

9. A combination cotton huller and cleaner including a huller chamber, a cleaner chamber, means to selectively direct the incoming cotton to either of said chambers, a plurality of means to control the degree of hulling including an adjustable baffle, a series of knocker rolls arranged at different distances from a saw roll, and an adjustable stop baffle to control the discharge of refuse from said knocker rolls; and an adjustable valve to control the passage of cotton from said huller chamber to said cleaner chamber.

10. A combination cotton huller and cleaner including a huller chamber, a cleaner chamber, means to selectively direct the incoming cotton to either of said chambers, a plurality of means to control the degree of hulling including an adjustable baffle, a series of knocker rolls arranged at different distances from a saw roll, and an adjustable stop baffle to control the discharge of refuse from said knocker rolls; and an adjustable valve to control the passage of cotton from said huller chamber to said cleaner chamber, said valve also serving as a baffle when the cotton is passed directly from said feeder to said cleaner chamber.

In testimony whereof I hereunto affix my signature this 13 day of August, A. D. 1929.

JOHN ARNOLD STREUN.